No. 852,606. PATENTED MAY 7, 1907.
F. M. HITCH.
HAY CAP.
APPLICATION FILED JULY 20, 1906.
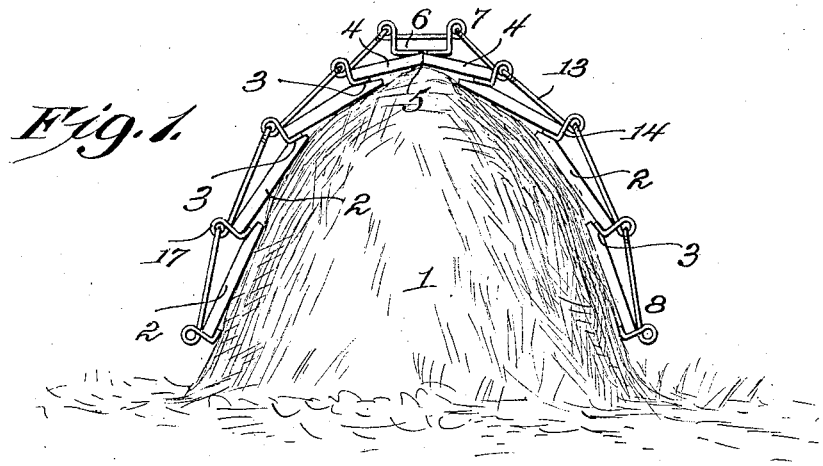
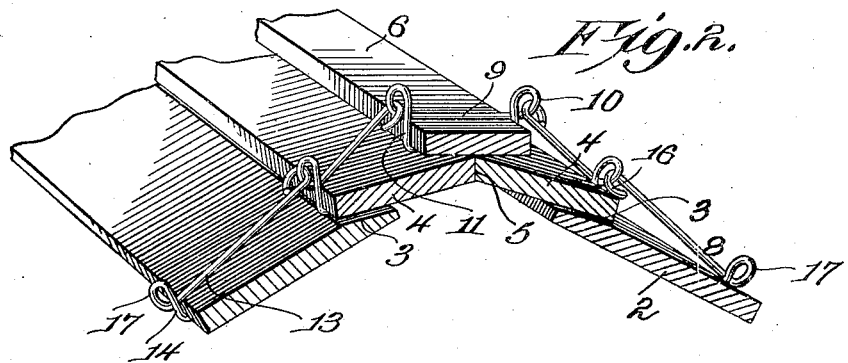
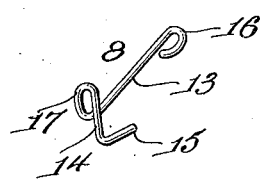
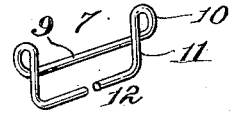
Frank M. Hitch, Inventor
Witnesses
Louis C. Starke
By
Attorney

UNITED STATES PATENT OFFICE.

FRANK M. HITCH, OF JUNIATA, NEBRASKA, ASSIGNOR OF ONE-HALF TO GEORGE B. WYCKOFF, OF JUNIATA, NEBRASKA.

HAY-CAP.

No. 852,606.      Specification of Letters Patent.      Patented May 7, 1907.

Application filed July 20, 1906. Serial No. 327,093.

*To all whom it may concern:*

Be it known that I, FRANK M. HITCH, a citizen of the United States, residing at Juniata, in the county of Adams and State of Nebraska, have invented a new and useful Hay-Cap, of which the following is a specification.

The invention relates to improvements in hay caps.

The object of the present invention is to improve the construction of hay caps, and to provide a simple, inexpensive and efficient hay cap adapted to be readily applied to a hay stack or rick, and capable of protecting the same from the weather, and of effectually preventing the leak, which has heretofore occurred where the boards meet at the center of the top of the stack or rick.

A further object of the invention is to improve the construction of the chains heretofore employed, and to provide a chain, which will be adapted to support a comb board, over the abutting edges of the boards at the center of the top of the cap, to form a tight joint at that point.

With these and other objects in view, the invention consists in the construction and novel combination of parts hereinafter fully described, illustrated in the accompanying drawing, and pointed out in the claims hereto appended.

In the drawing:—Figure 1 is an end elevation of a hay cap, constructed in accordance with this invention, and shown applied to a hay stack. Fig. 2 is an enlarged detail perspective view of a portion of the hay cap. Fig. 3 is a detail perspective view of one of the side links of the chain. Fig 4 is a similar view of the central comb-board-holding link.

Like numerals of reference designate corresponding parts in all the figures of the drawing.

The hay cap, which is designed to be arranged on a hay stack 1, as illustrated in Fig. 1 of the drawing, comprises a plurality of overlapped boards 2, which may be of any desired number and which have their upper edges 3 beveled at their outer faces to fit beneath the lower edges of the adjacent boards. The top boards 4, which are arranged at the center of the top of the stack, have their inner longitudinal edges 5 abutting against each other, as clearly shown in Fig. 2 of the drawing, and are arranged at a slight inclination to shed the water, which will flow downward over the overlapped inclined boards without entering the hay stack or rick.

In order to prevent the hay cap from leaking at the center of the top, where the inner longitudinal edges of the boards 4 abut against each other, the hay cap is provided with a horizontal comb board 6, which is narrower than the side boards, but which is of sufficient width to cover the central joint and exclude water therefrom. The comb board is adapted to prevent the leaking, which has heretofore occurred at the center of the top of a hay cap, when the central boards have their inner edges fitted together.

The boards of the hay cap are supported in position by center and side links 7 and 8. The central link 7, which is provided with a substantially rectangular opening to receive the comb board, is constructed of a single piece of metal, and is partially coiled equidistant of the center to provide a straight top side 9, and exteriorly projecting end eyes 10, which are located at the ends of the link and which extend upwardly from the side edges of the comb board 6, as clearly shown in Fig. 2 of the drawing. The terminal portions of the wire are angularly bent, and are substantially L-shaped to provide vertical ends 11 and horizontal bottom portions 12. The link is resilient and the L-shaped terminal portions engage and clamp the comb board, whereby the latter is firmly held in position and is effectually prevented from slipping in either direction. The side links are also constructed of a single piece of metal, each consisting of a straight upper side 13, a lower end 14 and a short lower side 15. The metal is bent at the upper end of the side 13 to provide an eye 16, and is then partially coiled and crossed at the lower end of the side 13 to provide an exteriorly projecting eye 17, and is angularly bent to form the L-shaped terminal portion, which constitutes the end 14 and the lower side portion 15. The upper eyes 16 of the uppermost side links 8 are linked into the end eyes of the central link; the upper sides 13 of the side links are arranged at an inclination, and the outer or lower edges of the side boards are engaged by L-shaped terminal portions of the side links. These L-shaped terminal portions of the side links receive and support the side boards, which constitute the hay cap. The lower eyes 17 of the side links are linked into the upper eyes of the contiguous side links.

It will be seen that the hay cap is exceedingly simple and inexpensive in construction, that it effectually prevents water from leaking into a stack or rick at the center of the top thereof, and that the chains securely support the comb board and the side boards in proper position.

Having thus fully described my invention, what I claim as new and desire to secure by Letters Patent, is:—

1. A hay cap comprising inclined overlapped side boards, a comb board arranged upon and covering the joint at the inner contiguous edges of the uppermost side boards, and a chain supporting the side boards and provided with a substantially rectangular central link receiving the comb board, and having resilient clamping portions for engaging the same.

2. A hay cap comprising inclined overlapped side boards, a comb board arranged upon and covering the joint at the inner contiguous edges of the uppermost side boards, and a chain composed of a central substantially rectangular link provided with a continuous straight side and having substantially L-shaped terminal portions forming the ends and the opposite side of the central link, said link being also provided with end eyes formed by coiling the material at the end, and side links supporting the side boards and provided with eyes, the eyes of the uppermost side links being linked into the eyes of the central link.

In testimony, that I claim the foregoing as my own, I have hereto affixed my signature in the presence of two witnesses.

FRANK M. HITCH.

Witnesses:
C. J. VANHOUTEN,
C. E. LEMON.